Feb. 20, 1934.    F. FREYMAN    1,948,291
APPARATUS FOR GAUGING MEMBERS FOR ASSEMBLAGE
Filed Nov. 8, 1927    2 Sheets-Sheet 1

Inventor
Fred Freyman
by _____ Att'y.

Feb. 20, 1934.  F. FREYMAN  1,948,291
APPARATUS FOR GAUGING MEMBERS FOR ASSEMBLAGE
Filed Nov. 8, 1927  2 Sheets-Sheet 2
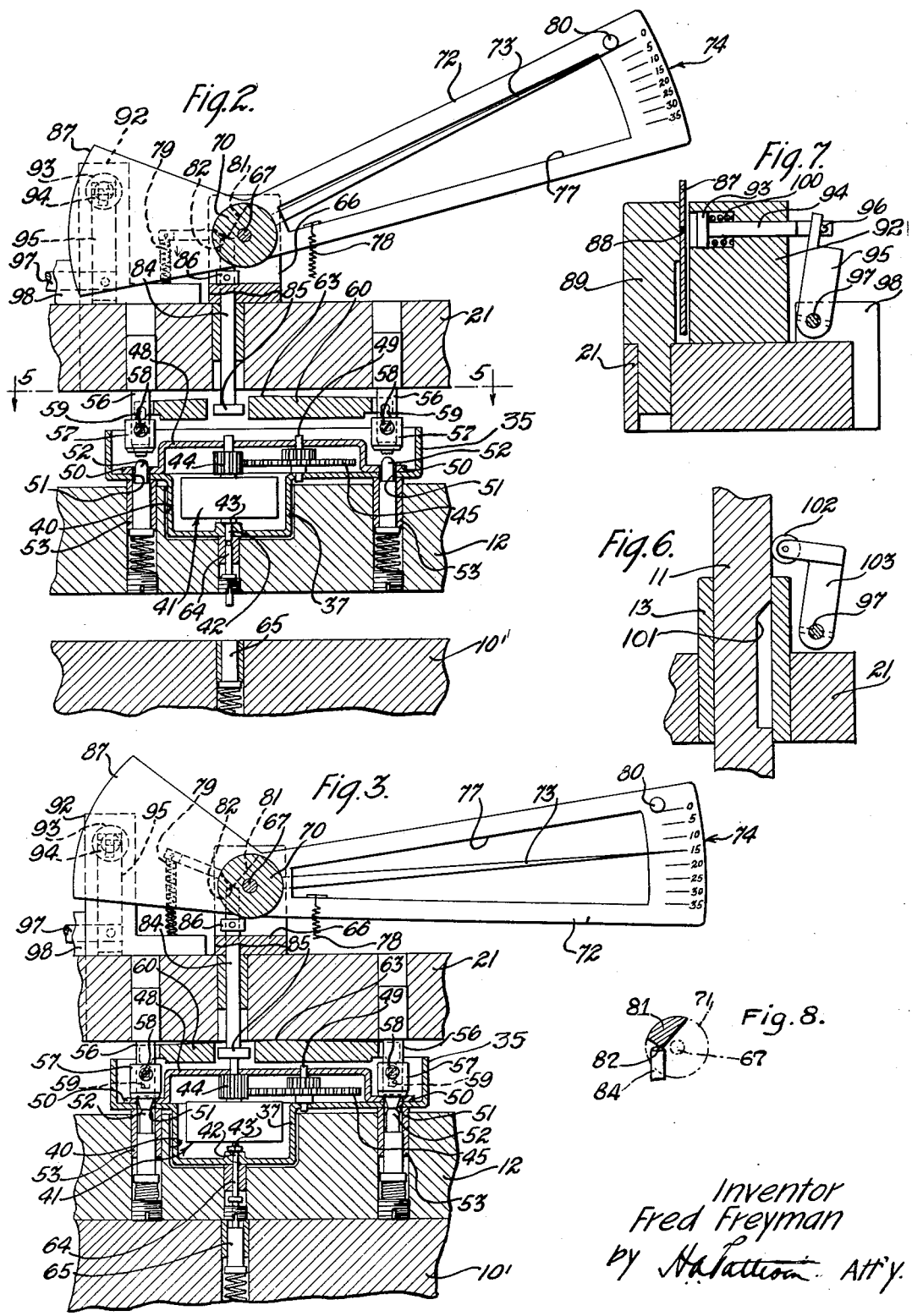
Inventor
Fred Freyman
by H. A. Patton Att'y.

Patented Feb. 20, 1934

1,948,291

UNITED STATES PATENT OFFICE 1,948,291

APPARATUS FOR GAUGING MEMBERS FOR ASSEMBLAGE

Fred Freyman, La Grange, Ill., assignor to Western Electric Company, Incorporated, New York, N. Y., a corporation of New York Application November 8, 1927. Serial No. 231,799

4 Claims. (Cl. 33—180)

This invention relates to apparatus for gauging members for assemblage, and more particularly to apparatus for gauging parts of a telephone calling device for final assemblage.

In telephone calling devices of the type disclosed in U. S. Patent No. 1,161,854 issued to O. F. Forsberg, November 30, 1915, it is essential that the end clearance between the rotating and stationary parts be accurately gauged and it is in connection with the manufacture of such devices that the present invention is particularly useful, although its application is obviously more general. As disclosed in the patent, the governor shaft has one end journaled in the case and its opposite end journaled in the bridge piece, thrust washers being associated with the shaft to allow for proper end clearance. Heretofore, due to slight manufacturing variations in the dimensions of the particular parts to be assembled and to provide proper end clearances between the rotatable and stationary parts, it has been the practice in some instances to perform several separate gauging operations.

The object of this invention is to provide apparatus for accurately gauging elements constituting a device while in assembled relation with their cooperating elements.

In accordance with one embodiment of this invention as applied to an apparatus for gauging parts of a telephone calling device for final assemblage there is provided means for supporting and maintaining the governor shaft and the bridge piece of a calling device in a preliminarily assembled relation in their supporting casing with a thrust washer assembled between a shoulder of the shaft and the casing at one end of the shaft. The opposite end of the shaft is then engaged by a manually operable plunger, which is operatively associated with a scale and an index member which move together during a portion of the movement of the plunger. Upon a further movement of the plunger the scale is locked against movement and the shaft is moved into engagement with a spring actuated plunger which forces the shaft in an opposite direction until the shoulder of the shaft engages the surface of the bridge piece. This latter movement of the shaft causes the index member to move, the extent of movement indicating on a scale the amount of end play of the shaft between the seating surfaces of the shoulders thereof which may be compensated for by the use of the required number of washers.

Other objects and advantages of this invention will more fully appear from the following detailed description taken in connection with the accompanying drawings, in which Fig. 1 is a side view of an apparatus embodying the features of this invention designed for gauging parts of a telephone calling device for final assemblage;

Fig. 2 is a fragmentary vertical section taken substantially on the line 2—2 of Fig. 4, the parts being illustrated at a point intermediate their normal and final operative positions;

Fig. 3 is a view similar to Fig. 2 with the parts shown in a final operative or indicating position;

Figure 4:
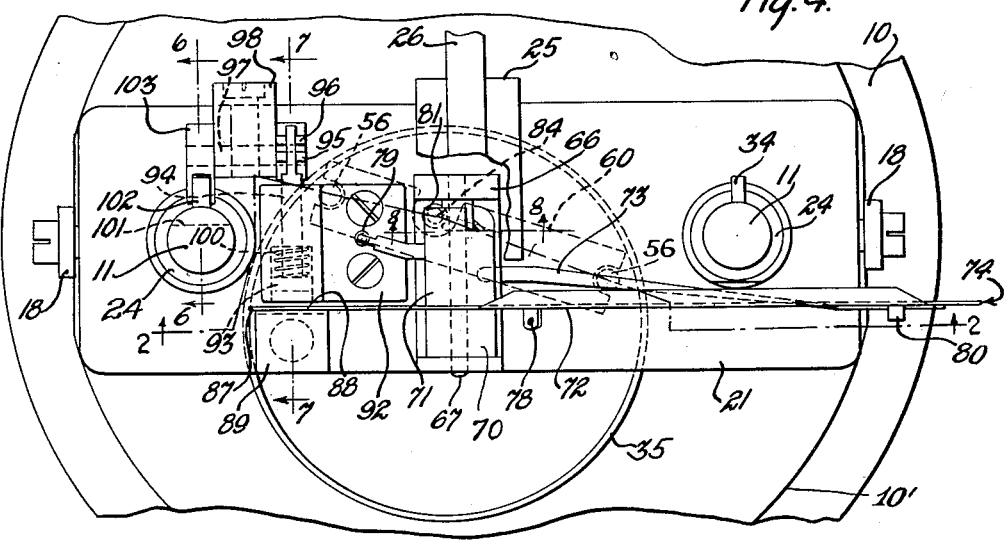
Fig. 4 is an enlarged fragmentary plan view.
Figure 5:
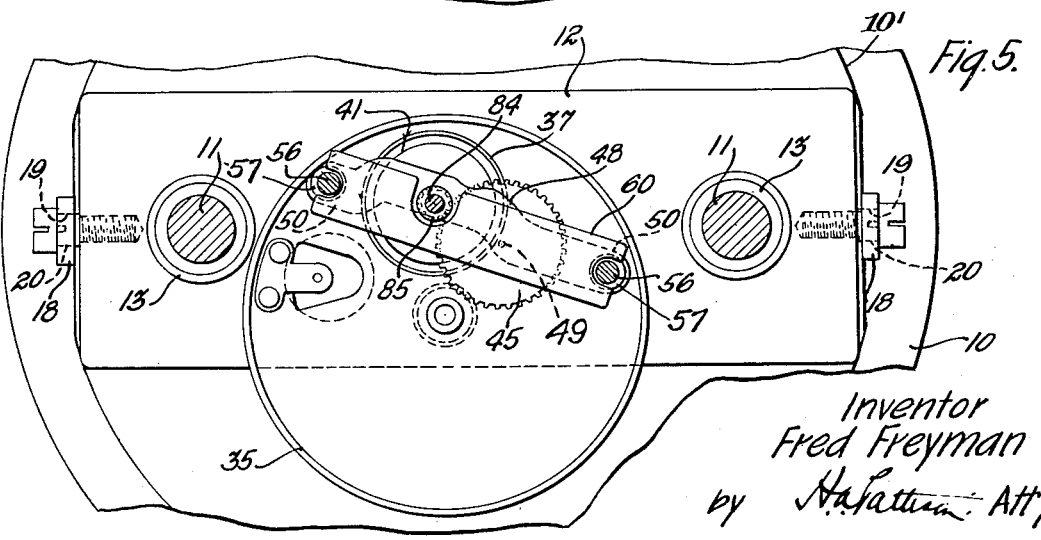

Fig. 5 is a fragmentary horizontal section taken on the line 5—5 of Fig. 2, looking in the direction indicated by the arrows, and Figs. 6, 7 and 8 are fragmentary vertical sections taken on the lines 6—6, 7—7 and 8—8, respectively, of Fig. 4 looking in the direction indicated by the arrows.

Figure 1:
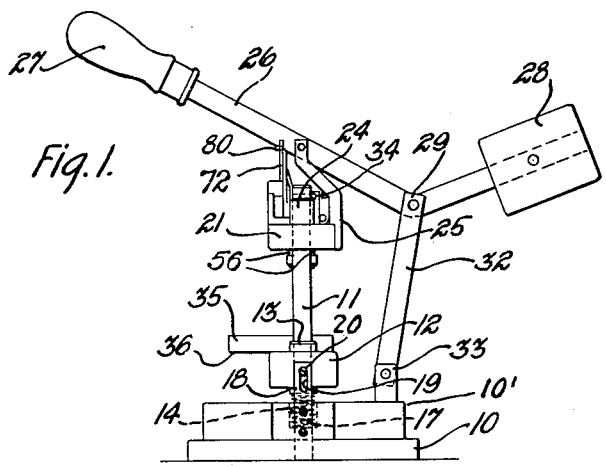

Referring now to the drawings in detail wherein like reference numerals indicate similar parts in the several views, and particularly to Figs. 1 and 4, a circular base 10 supports a pair of fixed diametrically opposite aligning pins 11 which extend upwardly from the upper surface of a reduced circular portion 10' thereof. A rectangular shaped lower head or support member 12 is reciprocally mounted upon the pins, a pair of sleeves 13 fixed to the head member being slidable upon the pins. Surrounding each of the pins 11 below the sleeve 13 and within an annular depression 14 formed in the upper surface of the base 10 and coaxial with the pin is a compression spring 17, shown in dotted outline in Fig. 1. The springs 17 normally maintain the head member 12 in its uppermost position (Figs. 1 and 2), the extent of its movement being limited by a pair of vertically disposed straps 18 secured at their lower ends to flattened diametrically opposite surfaces of the reduced portion 10' of the base 10. The upper ends of the straps are provided with slots 19 within which ride the heads of screws 20 fixed to the head member 12. It will be apparent that the springs 17 under a suitable compression and bearing at opposite ends, respectively, against the lower ends of the sleeves 13 and the depressed surfaces of the base 10 formed by the depressions 14, will normally maintain the head member 12 in its uppermost position, which is limited by the upper ends of the slots 19. Reciprocally mounted upon the pins 11 above the head member 12 is another head or support member 21 which in plan view is similar to the lower head or support member 12, sleeves 24 fixed to the head member 21 being slidable upon the pins. Secured to the rear side of the upper head member 21, as viewed in Fig. 4, or the right side as viewed in Fig 1, is a bracket 25 which extends upwardly and to a point midway between the pins 11 and coaxial with the base 10, the upper end of the bracket 25 being bifurcated. Pivoted to the bracket 25 between the furcations thereof is an operating lever 26 having a hand grip 27 at one end and a counterweight 28 fixed upon its angularly disposed portion extending from its fulcrum point 29. The lever 26 is fulcrumed between the furcations of a bifurcated upper end of a link 32, the lower end of the link being pivoted to a post 33 fixed to the base 10. A stop pin 34 extending from the peripheral surface of the right aligning pin 11 (Fig. 4) serves to limit the upward movement of the head member 21 due to the pin being engaged by the upper surface of the associated sleeve 24 (Fig. 1).

The upper surface of the head or support member 12 is provided with depressions for receiving certain portions of a dial casing 35 which portions project from the lower surface of the casing. Referring particularly to Figs. 2 and 3, the casing 35 is provided with an eccentrically disposed depending circular governor cup 37, which when the casing is mounted in the member 12 during the gauging operation extends into a circular depression 40 of the member. Coaxially carried in the cup 37 is a governor assemblage 41, a shouldered shaft 42 thereof resting at its shoulder upon a thrust washer 43 which rests on a bearing boss formed on the surface of the cup, the reduced lower end of the shaft 42 projecting through the wall of the cup and slightly therebelow. Upon the upper end of the shaft 42 is mounted a pinion 44 meshing with a gear 45 which in the final assemblage of the calling device receives motion from mechanism (not shown). A bridge piece 48 spans the governor assemblage and forms an upper bearing for the shaft 42 and for a shaft 49 of the gear 45, the shafts projecting slightly beyond the surface of the bridge piece. In the particular type of governor assemblage 41 illustrated in the drawings the upper surface of the pinion 44 forms a shoulder on the shaft 42. The bridge piece 48 is provided at each end with apertured feet 50, which in the final assemblage of the calling device are secured to the casing 35 by screws (not shown) which are threaded into apertures 51 formed in the casing. Due to slight manufacturing variations in the distance between the bearing surfaces of the shoulders of one shaft as compared to another and the distance between the bottom surface of the bridge feet 50 and the under seating surface of the bridge piece 48, the space or end play between the upper surface of the pinion 44 and the under surface of the bridge piece will vary in one assemblage from another. These distances vary in different pieces, due in some instances to slight variations in the thickness of the stock from which they are made. In the operation of the apparatus to be described hereinafter, this space is automatically and accurately gauged so that a suitable thrust washer or washers may be selected for the space to provide a predetermined end clearance between the stationary and rotatable parts. This gauging is not accomplished by gauging each part individually, but by mounting the several parts, picked indiscriminately from supplies thereof and preliminarily assembled together in the apparatus and gauging them thus assembled in one operation. In gauging in this manner the variations in thickness of stock or length of parts, etc., it will be apparent that the variations are not vital as long as they are within predetermined manufacturing tolerances. Carried by the support member 12 and arranged to register with the apertures 51 of the dial casing 35 when positioning it upon the member 12 is a pair of spring actuated pilot pin members 52 mounted to reciprocate in bushings 53 which extend slightly above the surface of the member 12, the under surface of the dial casing 35 resting upon the bushings. With the dial casing 35 in position for the gauging operation the pins 52 (Fig. 2) freely extend through and above the apertures in the feet 50 of the bridge piece.

Fixed to and depending from the lower surface of the head or support member 21 and coaxially arranged with the pin members 52, is a pair of pin members 56 upon reduced lower ends of which are reciprocally mounted bushings 57. The bushings 57 are maintained upon the pins 56 by screws 58 threaded into the bushings and adapted to engage either end shoulder of a depressed milled surface 59 on the pin. Normally the bushings 57 are in their lowermost positions as shown in Fig. 2. Between the upper end surfaces of the bushings 57 and the lower surface of the member 21 is an equalizer bar 60 (Figs. 2 and 5), opposite ends of which are bifurcated to straddle the pins 56, the lower surfaces of the furcations being arc shaped and arranged to rest upon diametrically opposite points upon the upper end surfaces of the bushings 57. In the operation of the apparatus a high point 63 formed on the upper surface of the bar 60 is engaged by the lower surface of the head member 21 as the latter descends, thus serving to apply an equal force to either end of the bar, which is transmitted to the bushings 57, the bar rocking about the point 63 and thereby serving to clamp with equal force both ends of the bridge piece 48 to the casing 35. Reciprocally carried in the head or support member 12 and coaxially arranged with the governor shaft 42 is a shouldered pin or plunger 64 which is maintained in its lowermost or normal position by gravity with its end depending from the lower surface of the head member 12 (Fig. 2). The upper end of the plunger 64 in the normal position thereof lies slightly below the lower end of the governor shaft 42 to accommodate varying lengths of the shaft 42 which may extend from the lower surface of the cup 37, or in some instances be disposed thereabove, the diameter of the plunger 64 being such that it may enter the aperture in the cup to engage the end of the shaft. Mounted in the base 10 and normally positioned flush with the upper surface thereof is a spring actuated plunger 65 which is coaxially arranged with the plunger 64.

Upon the upper surface of the head or support member 21 is a U-shaped bracket 66, the vertical arms thereof supporting therebetween a horizontally disposed fixed pin 67. Rotatably carried upon the pin 67 are sleeves 70 and 71 (Figs. 2 and 4). Fixed to rotate with the sleeves 70 and 71 is a scale plate 72 and an index member or pointer 73, respectively. Upon the front face and at the right end of the plate 72 (Fig. 2) are a series of indications 74 representing fractions of measurement. In the present embodiment of this invention the indications 74 or divisions are arranged to represent differences of 5/1000 of an inch beginning at zero. Although not shown in the drawings, in actual practice the fractions of measurement will be indicated in 1/1000 of an inch.

The pointer 73 as clearly shown in Fig. 4 is formed to extend from the rear side of the plate 72 through an opening 77 thereon to the front side and terminates in a fine point adjacent the indications 74 thereof. Operatively attached to the scale plate 72 and the pointer 73 are tension springs 78 and 79, respectively, the spring 78, which is the weaker one, being arranged to exert a force on the plate 72, tending to rock it clockwise about the pin 67, while the spring 79, which is the stronger one, is arranged to rock the pointer 73 counter-clockwise about the pin 67. The extent of the movement of the pointer 73 counter-clockwise relative to the plate 72 is limited by a stop pin 80 attached to the plate and lying in the path of the pointer. The sleeve 71 at its rear end is provided as shown in Figs. 4 and 8 and indicated in dotted outline in Fig. 2, with an arm 81, a lower and right angle edge portion 82 of which engages the upper end face of a headed pin or plunger 84. The plunger 84 is reciprocally mounted in the upper head member 21 and the horizontal arm of the bracket 66 and is in coaxial alignment with the governor shaft 42, and the plungers 64 and 65. A head 85 of the plunger 84 extends below the lower surface of the head or support member 21, the equalizer bar 60 being slotted as clearly shown in Figs. 2 and 4 to clear the head and permit its reciprocal movement to and from the upper end of the governor shaft 42 in the operation of the apparatus to be referred to hereinafter. A collar 86 fixed to the plunger 84 and normally resting upon the horizontal arm of the bracket 66 limits the downward movement of the plunger 84 while the force of the spring 79 maintains the edge portion 82 of the arm 81 in engagement at all times with the end of the plunger 84, since the spring 79 is stronger than the spring 78, and thus the free end of the pointer 73 will be held against the stop pin 80 of the plate 72 until relative movement occurs between the plate and the pointer in the operation of the apparatus. It will be apparent that due to slight variations in the length of different governor shafts 42 the space between the head 85 and the upper end face of the particular shaft 42 carried in the casing 35 will not be uniform. Thus it is necessary to maintain the pointer 73 at zero on the scale plate 72 until the head 85 engages the shaft 42 and shortly thereafter the scale plate 72 is locked against rotation on the pin 67.

The plate 72 to the left of the pivot pin 67 (Fig. 2) is provided with a segmental shaped arm 87 which normally is in sliding contact at its front face with a clamping surface 88 (Fig. 7) of a post 89 fixed to the head member 21. Mounted in a bracket 92 adjacent the rear face of the arm 87 is a plunger 93 (Fig. 7) slidable in a pocket formed in the bracket 92. A reduced stem portion 94 of the plunger 93 projects from the bracket 92 and is operatively engaged at its free end between the furcations of a bifurcated lever 95 bearing against a pin 96 inserted through the stem 94. The lever 95 is fixed to a shaft 97 journaled in a bracket 98. In the operation of the apparatus from an operative position to its normal position the shaft 97 is rocked clockwise to the position shown in Fig. 6. When the lever 95 is free to move counter-clockwise as viewed in Fig. 7, a compression spring 100 surrounding the stem 94 and mounted in the pocket of the bracket 92 behind the plunger 93 serves to move the latter into engagement with the arm 87 of the plate 72, thereby clamping the arm 87 to the surface 88 of the post 89 and thus locking the scale plate 72 from rotary movement. The left aligning pin 11 (Figs. 4 and 6) is provided along its periphery with a cut-out portion or cam surface 101 which is engaged by a roller 102 carried by a lever 103 fixed to the shaft 97. The position of the cam surface 101 upon the pin 11 is such that at a predetermined point in the downward movement of the head or support member 21, the roller 102 and the cam surface 101 will be operatively aligned, at which instant the spring 100 will expand and urge the plunger 93 against the arm 87 and lock it to the post 89.

In the operation of the apparatus an operator positions a dial casing 35 carrying a governor assemblage 41 and a bridge piece 48 preliminarily assembled therein with a thrust washer 43 positioned between a shoulder of the governor shaft 42 at its lower end and the casing, upon the lower head or support member 12, as clearly shown in Fig. 1. As hereinbefore mentioned, the head member 12 is provided with a depression 40 for receiving the governor cup 37 and also other depressions for receiving other projections not illustrated, since they are not believed necessary for a complete understanding of this invention. In positioning the casing 35 on the head member 12 the pilot pin members 52 enter the apertures 51 of the casing and of the bridge piece 48, thus maintaining the casing in a predetermined position on the head member 12 with its lower surface resting on the bushings 53. The operator then grips the lever 26 by means of the hand grip 27 and rocks it downwardly in a single continuous movement to its extreme lowermost position, which causes the head or support members 21 and 12 to assume the positions shown in Fig. 3. In the downward movement of the head member 21 the pin members 56 engage the pilot pin members 52, pressing them downward, the tapered ends of the pin members 56 entering the apertures of the casing and the bridge piece vacated by the pin members 52. The bushings 57 carried by the pin members 52, it will be apparent, move upwardly relative to the pin members upon their lower surfaces engaging the upper surfaces of the feet of the bridge piece 48 and thus carrying with them the equalizer bar 60 which, as hereinbefore described, serves to clamp each end of the bridge piece with an equal force to the casing 35, the bar coming to a rest against the under surface of the head or support member 21 and thereafter the head members with the casing and the bridge piece move as a unit. Just before the completion of this clamping operation the head 85 of the plunger 84 engages the end of the governor shaft 42 projecting from the bridge piece, thus insuring a contact between the latter members at the time of clamping. Preferably, the clamping and contact as just described should occur simultaneously, but as hereinbefore mentioned the length of the governor shaft 42 in all instances is not the same. The engagement of the head 85 with the shaft 42 before the completion of the clamping operation results in a slight upward movement of the plunger 84 which is transmitted to the pointer 73 by the engagement of the upper end of the plunger 84 with the edge portion 82 of the sleeve 71, thus rocking clockwise the latter on the pivot pin 67 against the tension of the spring 79. As the pointer 73 is rotated clockwise the scale plate 72 will move in unison therewith, due to the tension of the attached spring 78. During this movement no relative motion occurs between the plate 72 and the pointer 73 and at the completion thereof the plate 72 will be positioned as shown in Fig. 3, only the pointer 73 will still be in engagement with the pin 80 as shown in Fig. 2. With the casing 35 and bridge piece 48 clamped as just described and in the continued downward movement of the head or support member 21 the lower head or support member 12 will move in unison therewith, thus moving the lower end of the plunger 64 toward the upper end of the spring actuated plunger 65. Just before contact is made between the latter members the roller 102 is operatively aligned with the cam surface 101 of the pin 11, thus permitting the spring 100 to expand and in the manner hereinbefore described cause the arm 87 of the scale plate 72 to be locked to the post 89. Upon the plunger 64 contacting with the plunger 65 the former will be moved upwardly, due to the resistance offered by the spring associated with the plunger 65, thereby closing the gap between the plunger 64 and the lower end of the governor shaft 42 and moving the latter upwardly until the shoulder formed thereon by the upper end surface of the pinion 44 engages the under surface of the bridge piece 48, thereby taking up all end play between the stationary bridge piece and the rotatable shaft. As the head 85 of the plunger 84 is engaged at this time with the upper end of the shaft 42, the plunger by its operative engagement at its upper end with the pointer 73 rocks the latter clockwise and at the end of its movement it indicates in conjunction with the indications 74 upon the scale plate 72 the true amount of end play, in thousandths of an inch, between the bridge piece and the shaft. This indicator reading is observed by the operator and noted mentally, whereupon the hand lever is rocked upwardly until the sleeve 24 engages the pin 34 carried by the associated aligning pin 11, thus returning the apparatus to its normal position. The operator then removes the preliminarily assembled bridge piece 48 from the casing 35 and the shafts 42 and 49 before the removal of the casing from the head or support member 12, lays the bridge piece to one side in the casing and then selects a washer or a combination of them in accordance with the noted indicator reading, allowing for a predetermined normal end clearance between the shaft and the casing and the bridge at opposite ends thereof. The washer or washers as required are positioned on the shaft and the thus assembled parts are removed from the gauging apparatus.

By means of this invention it will be apparent it is not necessary to maintain the dimensions of the shaft and the stationary parts associated therewith within extremely close limits, and that no separate gauging operations are required for the particular parts to be assembled in order to obtain the amount of end play between the rotatable shaft and the stationary parts, thus the likelihood of an accumulation of errors is eliminated.

Although this invention has been described herein in connection with a telephone calling device, it will be understood that the invention is capable of other applications and is only limited by the scope of the appended claims.

What is claimed is:

1. In an apparatus for gaging interfitable members while in an assembled relation, means for supporting the members, means associated with said supporting means for clamping certain of the members in their assembled relation, means for moving another of the members relative to the clamped members, and means for measuring the extent of movability of the moved member relative to the clamped members.

2. In an apparatus for gaging members for assemblage, means for holding certain of the members against movement, means for moving another of the members relative to the held members, and means for measuring the extent of movability of said movable member relative to said held members, comprising an element held against movement and a pointer movable with the movable member, and cooperating with the held element for indicating the result of the measurement.

3. In an apparatus for gaging members for assemblage, means for supporting the members in their assembled relation wherein they are relatively movable a limited amount which varies according to the individual dimensions of the members, a movable dial and pointer, means whereby the dial and pointer are moved in unison until an operative engagement is made between the pointer and one of the members, means for thereafter holding the dial against movement, and means for causing a relative movement of the pointer-engaging member for actuating the pointer to indicate the amount of relative movability of the member while in assembled relation.

4. In an apparatus for gaging members for assemblage, a rotatably supported dial and pointer, means for rotating said dial and pointer in unison until an operative engagement is made between the pointer and one of the members, means for thereafter holding the dial against movement, and means for causing a relative movement of the pointer-engaging member for actuating the pointer to indicate the amount of relative movability of said member while in assembled relation.

FRED FREYMAN.